US005717606A

United States Patent [19]

Hara et al.

[11] Patent Number: 5,717,606

[45] Date of Patent: Feb. 10, 1998

[54] APPARATUS FOR JUDGING DRIVING ATTENTIVENESS WITH RESPECT TO A RATIO OF STEERING FREQUENCY COMPONENTS AND A METHOD THEREFOR

[75] Inventors: Toru Hara, Okazaki; Koichi Kamiya, Anjo; Yoshinaka Kawakami, Kariya; Tetsuya Furuichi, Okazaki, all of Japan

[73] Assignee: Mitsubishi Jidosha Kogyo Kabushiki Kaisha, Tokyo, Japan

[21] Appl. No.: 428,868

[22] Filed: Apr. 25, 1995

[30] Foreign Application Priority Data

Apr. 26, 1994 [JP] Japan .................................... 6-088456

[51] Int. Cl.[6] ............................ B60K 28/02; G08B 21/00

[52] U.S. Cl. .................... 364/551.01; 180/272; 340/439; 340/576; 364/424.054; 364/424.057

[58] Field of Search .................................... 364/484, 485, 364/424.01, 424.05, 419.2, 550, 551.01, 423.098, 424.051, 424.054, 424.057; 340/425.5, 439, 575, 576; 395/3, 61, 905, 911, 913, 900; 180/271, 272

[56] References Cited

U.S. PATENT DOCUMENTS

| | | | |
|---|---|---|---|
| 4,278,969 | 7/1981 | Woods | 340/576 |
| 4,463,347 | 7/1984 | Seko et al. | 340/576 |
| 4,586,032 | 4/1986 | Seko et al. | 340/576 |
| 4,594,583 | 6/1986 | Seko et al. | 340/576 |
| 5,189,619 | 2/1993 | Adachi et al. | 364/426.04 |
| 5,446,660 | 8/1995 | Miichi et al. | 364/424.05 |
| 5,488,353 | 1/1996 | Kawakami et al. | 340/576 |

FOREIGN PATENT DOCUMENTS

| | | |
|---|---|---|
| 0119486 | 7/1987 | European Pat. Off. . |
| 0119484 | 6/1988 | European Pat. Off. . |

*Primary Examiner*—James P. Trammell
*Assistant Examiner*—Edward J. Pipala

[57] ABSTRACT

Driving attentiveness judging method and apparatus for accurately determining the driver's attentiveness level during driving of a motor vehicle are provided wherein steering angle data and vehicle speed data, respectively supplied from a steering angle sensor and a vehicle speed sensor, are sampled by a steering angle data sampling section and a vehicle speed data sampling section, respectively. Respective levels of road shape component, visual steering component, and corrective steering component of the steering angle data are detected by a steering angle data processing section, and a fuzzy inference output representing a driving attentiveness level is obtained by a fuzzy inference section in accordance with fuzzy rules and the three steering component levels. In accordance with the fuzzy inference output which has been subjected to vehicle speed-dependent correction by a vehicle speed correcting section, the driving attentiveness level is displayed at a display device, and also a warning mark is displayed if the vehicle speed-corrected fuzzy inference output is small.

29 Claims, 9 Drawing Sheets

APPARATUS FOR JUDGING DRIVING ATTENTIVENESS WITH RESPECT TO A RATIO OF STEERING FREQUENCY COMPONENTS AND A METHOD THEREFOR

BACKGROUND OF THE INVENTION

1. Field of the Invention

The present invention relates to driving attentiveness judging method and apparatus for judging the level of driver's attentiveness during drive of a motor vehicle.

2. Description of the Related Art

Motor vehicles are equipped with an antiskid brake system or the like for attaining a proper braking force, to thereby enhance the safety of motor vehicles. However, even though a vehicle itself has no problem in respect of safety, the safety can be lost if the driver dozes off or looks aside while driving. Namely, to ensure safe driving, the safety of the whole man-vehicle system must be improved.

To this end, various proposals have been made which include an apparatus wherein a stimulus is given to the driver to awake him or her when a driver's doze during driving is detected, a system wherein the driver is prompted to take a rest when it is judged based on, for example, a steering wheel operation pattern, that the driver's fatigue has increased, and a system wherein a warning is given when it is judged that the driving attentiveness is low.

It is, however, difficult to quantize the degree of doze, the degree of fatigue, or the degree of lowering of attentiveness. Further, the steering wheel operation pattern observed, for example, when the attentiveness has lowered, differs from driver to driver even in the same situation, making it difficult to determine with high accuracy a lowering of driving attentiveness or the like based on the steering wheel operation pattern.

SUMMARY OF THE INVENTION

It is an object of the present invention to provide method and apparatus for judging driving attentiveness whereby the level of driver's attentiveness during driving of a motor vehicle can be accurately determined.

According to one aspect of the present invention, there is provided a driving attentiveness judging method comprising: a steering angle detecting step of detecting a steering angle of a motor vehicle to obtain steering angle data; a steering frequency component detecting step of detecting a plurality of steering frequency components of respective different frequency bands from the steering angle data; and an attentiveness determining step of estimating a driving attentiveness level based on the steering frequency components.

The advantage of the method of the present invention resides in that the driver's attentiveness level during driving of the vehicle can be accurately estimated based on the aforesaid plurality of steering frequency components. It is, therefore, possible to accurately detect a disorderly steering operation which can be caused by absentmindedness of the driver during monotonous driving or when the driver looks away from the road.

Preferably, the steering frequency component detecting step includes detecting a first steering frequency component corresponding to a road shape follow-up steering by a driver, a second steering frequency component which is on a higher frequency side than the first steering frequency component and which corresponds to a visual steering by the driver, and a third steering frequency component which is on a higher frequency side than the second steering frequency component and which corresponds to a corrective steering by the driver.

According to this preferred embodiment, the driving attentiveness judgment is less affected by variations among individuals, compared with the case wherein the driving attentiveness level is determined solely based on the visual steering component. Accordingly, it is unnecessary to set various setting values for determining the driving attentiveness so as to be suited to operating characteristics of individual drivers.

Still preferably, the attentiveness determining step includes obtaining, based on the ratio of the first steering frequency component to the second steering frequency component, a first steering action factor corresponding to predictiveness of steering action, and/or obtaining, based on the ratio of the third steering frequency component to the second steering frequency component, a second steering action factor corresponding to effort of steering action; obtaining based on the third steering frequency component a third steering action factor corresponding to deliberateness of steering action; and estimating the driving attentiveness level such that the driving attentiveness level lowers with reduction in level of the first and/or second steering action factor and with reduction in level of the third steering action factor.

In this preferred embodiment, a driving attentiveness level that well reflects the driver's steering action can be obtained, permitting proper driving attentiveness judgment.

Preferably, the steering frequency component detecting step includes detecting two steering frequency components of respective different frequency bands from the steering angle data. The attentiveness determining step includes estimating the driving attentiveness level based on the ratio of one to the other of the two steering frequency components. More preferably, the attentiveness determining step includes obtaining a steering action factor based on the ratio, and estimating the driving attentiveness level such that the driving attentiveness level lowers with reduction in level of the steering action factor.

According to this preferred embodiment, a driving attentiveness level that well reflects the driver's steering action can be estimated relatively easily.

Preferably, the attentiveness determining step includes performing fuzzy inference based on respective levels of the steering frequency components and a plurality of fuzzy rules, to thereby estimate the driving attentiveness level. In this preferred embodiment, the driving attentiveness level can be quantified by means of fuzzy inference using the fuzzy rules that appropriately relate the steering frequency component levels to the driving attentiveness level.

Preferably, the driving attentiveness judging method further comprises a vehicle speed detecting step of detecting vehicle speed. The steering frequency component detecting step includes detecting the aforesaid plurality of steering frequency components only when a vehicle operating state in which the vehicle speed is higher than or equal to a predetermined value and also the steering angle is smaller than or equal to a predetermined steering angle continues for a predetermined time period. In this preferred embodiment, the driving attentiveness level can be properly estimated during a vehicle operating condition suited for the driving attentiveness estimation.

Preferably, the driving attentiveness judging method further comprises a vehicle speed detecting step of detecting vehicle speed; and a vehicle speed correcting step of increasingly correcting the driving attentiveness level estimated in the attentiveness determining step when the motor vehicle is traveling at low vehicle speed. According to this preferred embodiment, it is possible to prevent a lowering of the driving attentiveness in a low-vehicle speed region from being overestimated.

Preferably, the driving attentiveness judging method further comprises a warning step of warning that driving attentiveness is low when the driving attentiveness level estimated in the attentiveness determining step is lower than a predetermined level. In this preferred embodiment, the driver is warned of a lowering of the attentiveness and thus reminded of safe driving, whereby potential danger can be eliminated.

According to another aspect of the present invention, there is provided a driving attentiveness judging apparatus comprising: steering angle detecting means for detecting a steering angle of a motor vehicle to obtain steering angle data; steering frequency component detecting means for detecting a plurality of steering frequency components of respective different frequency bands from the steering angle data; and attentiveness determining means for estimating a driving attentiveness level based on the steering frequency components. The advantage of the apparatus of the present invention lies in that the driving attentiveness level can be accurately estimated based on the aforesaid plurality of steering frequency components.

Preferably, the steering frequency component detecting means includes a data sampling section for sampling the steering angle data at predetermined intervals, and a steering angle data processing section for subjecting the sampled steering angle data to frequency analysis to obtain the plurality of steering frequency components. According to this preferred embodiment, the aforesaid plurality of steering frequency components can be properly obtained.

The apparatus of the present invention has other preferred embodiments corresponding to the aforementioned various embodiments according to the method of the invention, and similar advantages are obtained thereby.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
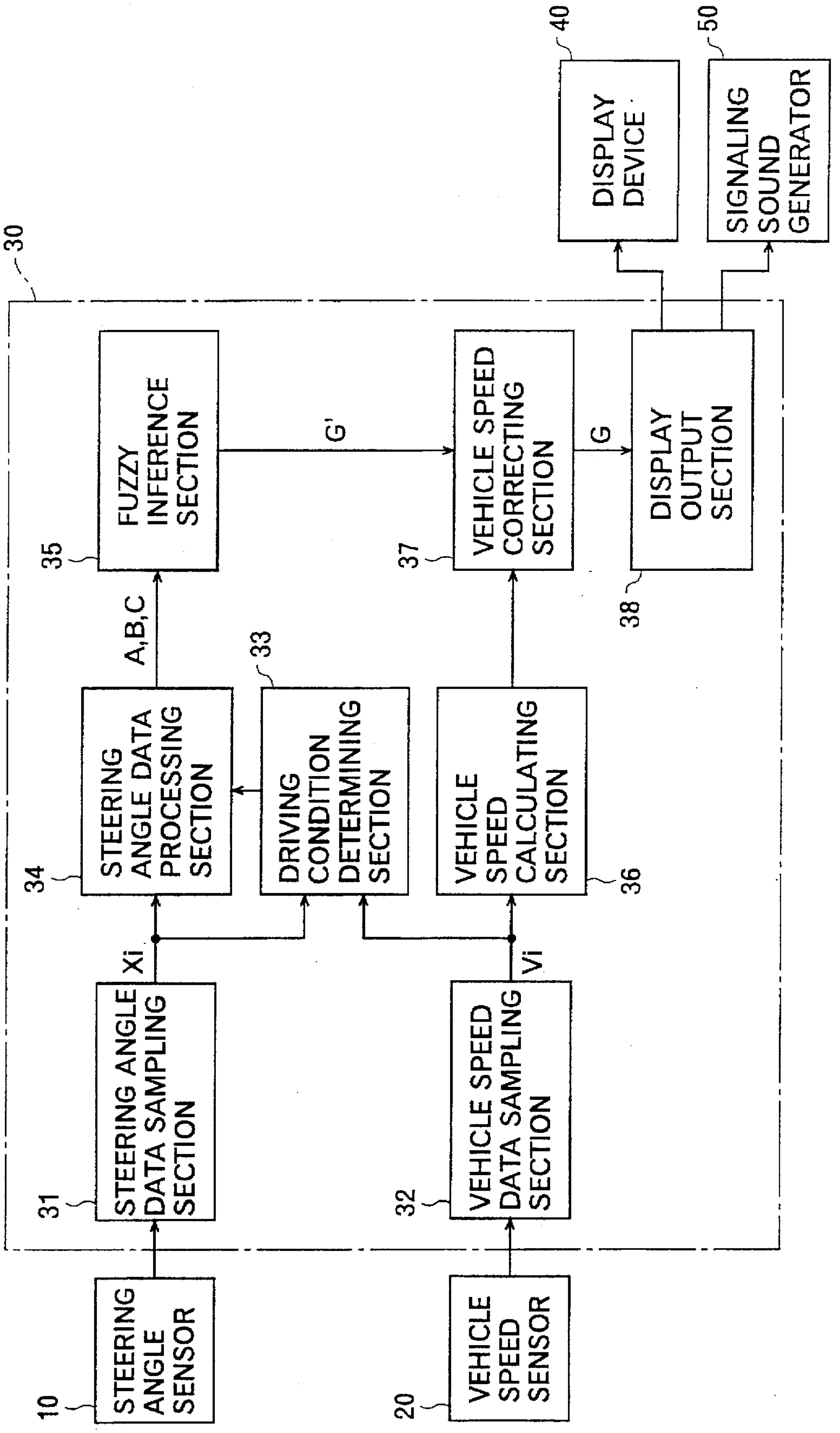
FIG. 1 is a schematic block diagram of an apparatus for carrying out a driving attentiveness judging method according to an embodiment of the present invention.

Referring to FIG. 1, an apparatus for carrying out a driving attentiveness judging method according to one embodiment of the present invention is mounted on a motor vehicle and comprises a steering angle sensor 10, a vehicle speed sensor 20, a computer 30, a display device 40, and a signaling sound generator 50.

In the driving attentiveness judging apparatus of this embodiment, the steering angle sensor 10 includes, for example, a slit disc mounted on the steering shaft of the vehicle for rotation together therewith, and two photointerrupters fixed to the steering column, though not illustrated in detail. Each photointerrupter is composed of a light-emitting diode and a phototransistor arranged on the side of the slit disc opposite the light-emitting diode so as to face the diode with the slit disc therebetween. As light is allowed to pass through or to be intercepted by the slit disc due to the driver's operation of the steering wheel, the photointerrupters output steering pulse signals of different phases at predetermined steering angles. The steering angle sensor 10 further includes a neutral position detecting section for generating a neutral position signal each time the steering wheel is located at the neutral position, and a signal processing section for obtaining data representing the steering angle (steering wheel position) based on the steering pulse signals and the neutral position signal.

Although not illustrated in detail, the vehicle speed sensor 20 includes, for example, a permanent magnet coupled via a speedometer cable to the output shaft of a transmission installed in the vehicle, and a reed switch facing the magnet, and as the magnetic poles of the permanent magnet approach or leave the reed switch during rotation thereof caused by rotation of the transmission output shaft, the reed switch contacts open or close, thereby generating a vehicle speed pulse signal. Also, the vehicle speed sensor 20 has a signal processing section for obtaining vehicle speed data based on the vehicle speed pulse signal.

The computer 30 includes a central processing unit, a memory, input/output units, timers, etc. (none of which are shown), and determines the driving attentiveness based on the steering angle data from the steering angle sensor 10 and the vehicle speed data from the vehicle speed sensor 20, as described later. In accordance with the result of the determination, the computer 30 displays a warning at the display device 40, and also causes the signaling sound Generator 50 to emit a signaling sound when the warning is displayed.

The display device 40 comprises, for example, a head-up display (front windshield display), not shown, which displays either a digital value of vehicle speed or a warning mark as a virtual image in the depth of the front windshield of the vehicle. This display has a display unit arranged within the instrument panel of the vehicle, and a combiner which is a thin reflecting film formed on a predetermined region of the compartment-side surface of the windshield as part of a glass layer during manufacture of the windshield. The display unit includes a high-intensity fluorescent display tube for displaying the image of a digital vehicle speed value or warning mark, and a reflecting mirror for reflecting the digital image etc. toward the combiner.

The signaling sound generator 50 comprises, for example, a buzzer arranged in the instrument panel.

The functions of the computer 30 will be now explained with reference to FIG. 1. The computer 30 includes a steering angle data sampling section 31 for sampling the steering angle data from the steering angle sensor 10 at predetermined intervals of, for example, 0.1 second, a vehicle speed data sampling section 32 for sampling the vehicle speed data from the vehicle speed sensor 20 at predetermined intervals of time, and a driving condition determining section 33 for determining, based on the steering angle data and the vehicle speed data, whether or not the vehicle is traveling in a condition suited for the driving attentiveness judgment.

The computer 30 further includes a steering angle data processing section 34 for subjecting the steering angle data, sampled by the steering angle data sampling section 31, to frequency analysis to detect respective levels of steering frequency components of different frequency bands from the steering angle data, and a fuzzy inference section 35 for performing fuzzy inference based on the levels of steering frequency components and a plurality of fuzzy rules.

Figure 2:
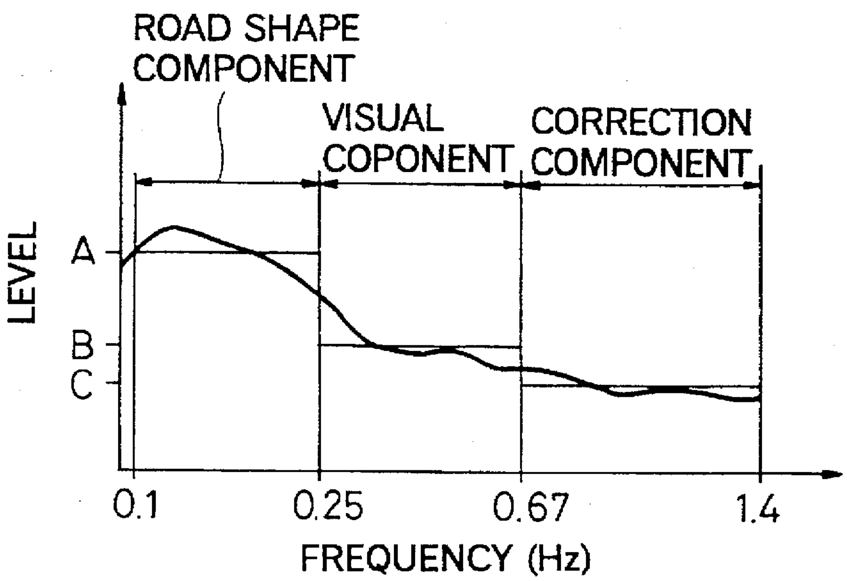
FIG. 2 is a graph showing the relationship of road shape component, visual component and correction component of steering angle data with frequency.

The steering angle data processing section 34 of this embodiment obtains a level A of first steering frequency component which corresponds to the driver's steering operation (road shape follow-up steering) according to the road shape (form of the vehicle's traveling course), a level B of second steering frequency component corresponding to the driver's visual steering, and a level C of third steering frequency component corresponding to the driver's corrective steering (see FIG. 2).

The first steering frequency component reflects a relatively large manipulation of the steering wheel by the driver in cases where the vehicle is moved on a road which may be of various forms, such as a straight course or a winding course, and typically falls within a frequency range of 0.1 to 0.25 Hz. The steering frequency component 0.1 Hz corresponds to a single manipulation of the steering wheel in 10 seconds, and the steering frequency component 0.25 Hz corresponds to a steering wheel manipulation in 4 seconds. The second steering frequency component is equivalent to the visual steering component set forth in the paper "Research on Driver's Steering Control Characteristic" in the symposium "Sports and Human Dynamics" from the Japanese Society of Mechanical Engineers, and reflects a steering wheel manipulation according to the road condition immediately before the vehicle. The second steering frequency component is on a higher frequency side than the first steering frequency component and typically falls within a frequency range of 0.25 to 0.67 Hz. The third steering frequency component reflects a steering wheel manipulation to finely correct the vehicle position on the road, is on a higher frequency side than the second steering frequency component, and typically falls within a frequency range of 0.67 to 1.4 Hz.

The inventors hereof have ascertained that the visual steering component level represents the driving attentiveness of the driver, and also that the visual steering component level associated with steering operation considerably varies with each driver even in the same traveling conditions. Namely, in order to determine with high accuracy the driving attentiveness by using only the visual steering component which is subject to considerable variation among individual drivers, it is necessary that discriminative reference values be set so as to be suited for the individual drivers.

Therefore, in this embodiment, the driving attentiveness is determined by using not only the second steering frequency component as the visual steering component, but also the first steering frequency component corresponding to the road shape follow-up steering and the third steering frequency component corresponding to the corrective steering, thereby eliminating the above disadvantage.

In this embodiment, the steering angle data processing section 34 performs 7-point, 15-point and 41-point moving average calculations corresponding to respective three low-pass filters having cut-off frequencies of 1.4 Hz, 0.67 Hz and 0.25 Hz, respectively. The first steering frequency component is derived from the 41-point moving average, the second steering frequency component is obtained by subtracting the 41-point moving average from the 15-point moving average, and the third steering frequency component is obtained by subtracting the 15-point moving average from the 7-point moving average. These steering frequency components correspond to band-pass filter outputs obtained in the frequency analysis according to a filter bank method. In other words, the steering angle data processing section 34 obtains the first, second and third steering frequency components by subjecting the steering angle data to frequency analysis.

Further, in this embodiment, the level of driving attentiveness is estimated by means of fuzzy inference, instead of a method in which the driving attentiveness level is determined by merely comparing each of the first, second and third steering frequency component levels with a discriminative reference value. Specifically, predictiveness P, effort Q, and reciprocal R of deliberateness in relation to the steering action of the driver are obtained as fuzzy variables based on one or more of the corresponding first, second and third steering frequency component levels A, B and C (FIG. 2). The predictiveness indicates the degree to which the road shape is predicted, the effort indicates the degree of correction with respect to the prediction, and the deliberateness indicates smoothness in operating the steering wheel. Further, fuzzy inference outputs which represent the ratios of the predictiveness, effort and deliberateness in the steering action are obtained by fuzzy inference based on the fuzzy variables and fuzzy rules.

In general, when the driving attentiveness is high, the ratios of the predictiveness and deliberateness are large whereas the ratio of the effort is small. On the other hand, when the driving attentiveness is low, the ratios of the predictiveness and deliberateness are small and the ratio of the effort is large. Accordingly, by making fuzzy inference using the predictiveness P, the effort Q, and the reciprocal R of deliberateness as the fuzzy variables, it is possible to quantify the driving attentiveness level, thus permitting proper evaluation of the driving attentiveness level.

According to this embodiment, the steering angle data processing section 34 obtains the predictiveness (first steering action factor) P from the first and second steering frequency component levels A and B, obtains the effort (second steering action factor) Q from the second and third steering frequency component levels B and C, and obtains the reciprocal (third steering action factor) R of deliberateness from the third steering frequency component level C. More specifically, the predictiveness P, the effort Q, and the reciprocal R of deliberateness are calculated according to the following equations:

$$P=\log(200A)/\log(200B)$$

$$Q=\log(200C)/\log(200B)$$

$$R=10\log(200C)$$

Figure 3:
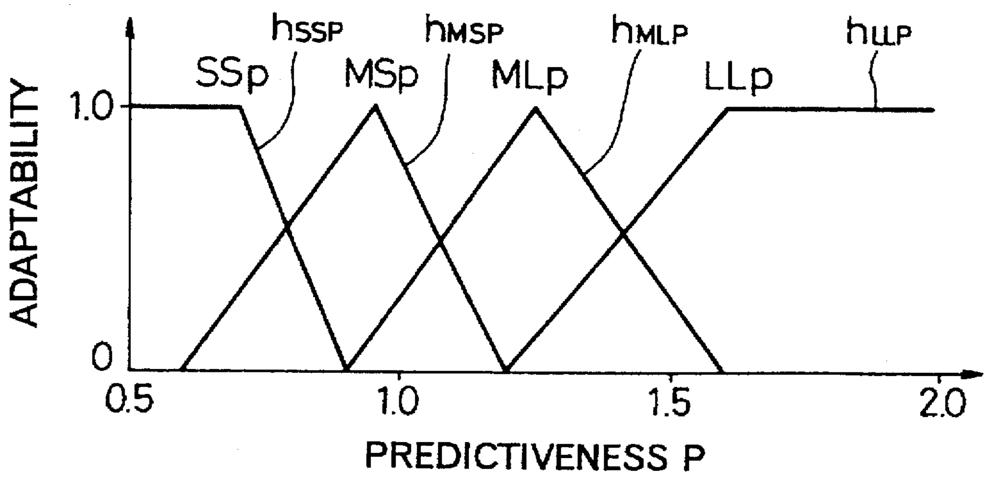
FIG. 3 is a graph showing fuzzy subsets associated with predictiveness P and membership functions determining the subsets.

In the fuzzy inference section 35 are set fuzzy subsets associated respectively with the predictiveness P, the effort Q, and the reciprocal R of deliberateness. In FIG. 3, symbols $SS_P$, $MS_P$, $ML_P$ and $LL_P$ are labels respectively indicating first to fourth fuzzy subsets in universe of discourse (carrier set) associated with the predictiveness P; and symbols $h_{SSP}$, $h_{MSP}$, $h_{MLP}$ and $h_{LLP}$ are first to fourth membership functions defining the first to fourth fuzzy subsets $SS_P$, $MS_P$, $ML_P$ and $LL_P$, respectively.

The first membership function $h_{SSP}$ is set such that the adaptability is fixed at "1.0" within a range of the predictiveness P from "0.5" to "0.7", decreases from "1.0" to "0" with increase of the predictiveness P from "0.7" to "0.9", and is fixed at "0.0" where the predictiveness P is greater than "0.9".

The second membership function $h_{MSP}$ is set such that the adaptability increases from "0.0" to "1.0" with increase of the predictiveness P from "0.6" to "0.95", decreases from "1.0" to "0.0" with increase of the predictiveness P from "0.95" to "1.2", and is fixed at "0.0" where the predictiveness P is outside these ranges.

The third membership function $h_{MLP}$ is set such that the adaptability increases from "0.0" to "1.0" with increase of the predictiveness P from "0.9" to "1.25", decreases from "1.0" to "0.0" with increase of the predictiveness P from "1.25" to "1.6", and is fixed at "0.0" where the predictiveness P is outside these ranges.

The fourth membership function $h_{LLP}$ is set such that the adaptability is fixed at "0.0" where the predictiveness P is smaller than "1.2", increases from "0.0" to "1.0" with increase of the predictiveness P from "1.2" to "1.6", and is fixed at "1.0" where the predictiveness P is greater than "1.6".

Figure 4:
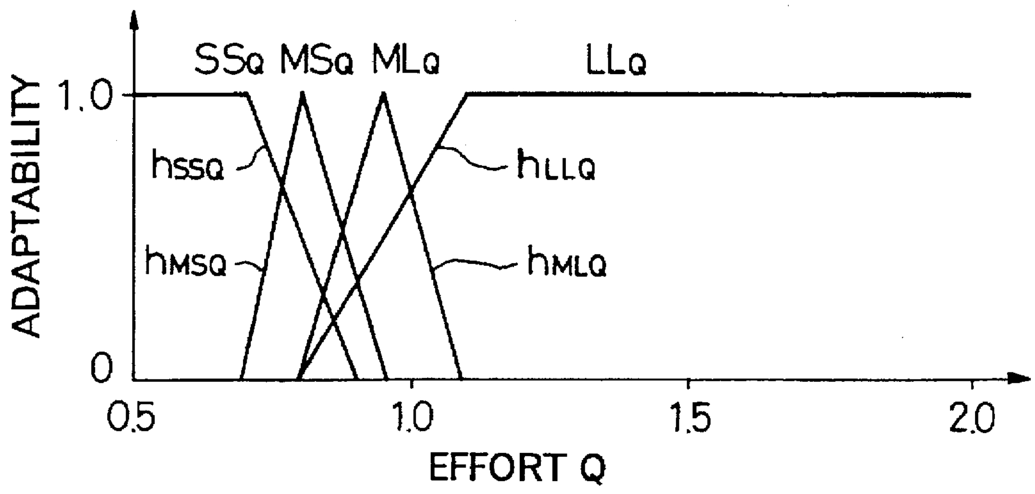
FIG. 4 is a graph showing fuzzy subsets associated with effort Q and membership functions determining the subsets.
Figure 5:
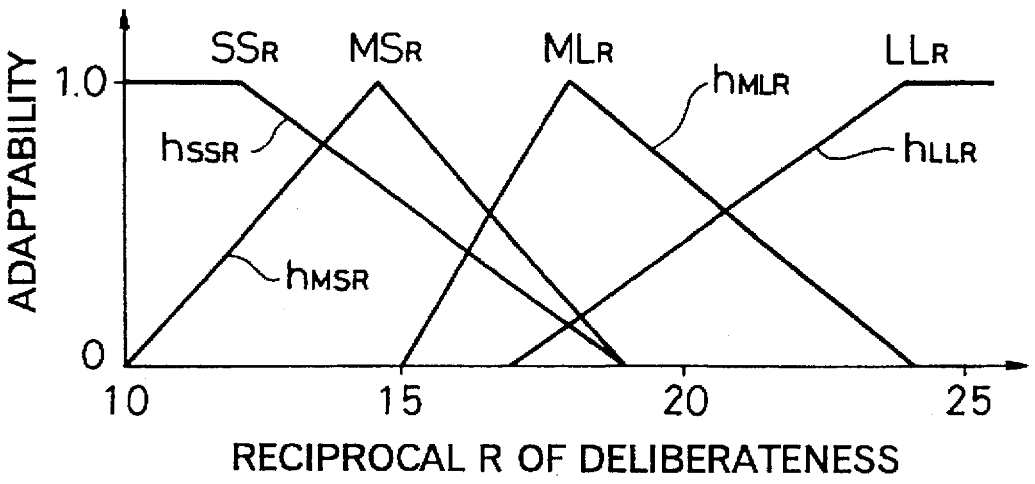
FIG. 5 is a graph showing fuzzy subsets associated with the reciprocal R of deliberateness and membership functions determining the subsets.

As shown in FIG. 4, first to fourth membership functions $h_{SSQ}$, $h_{MSQ}$, $h_{MLQ}$ and $h_{LLQ}$ respectively defining first to fourth fuzzy sets $SS_Q$, $MS_Q$, $ML_Q$ and $LL_Q$ are set with respect to the effort Q, though detailed description is not given here. Similarly, as shown in FIG. 5, first to fourth membership functions $h_{SSR}$, $h_{MSR}$, $h_{MLR}$ and $h_{LLR}$ respectively defining first to fourth fuzzy sets $SS_R$, $MS_R$, $ML_R$ and $LL_R$ are set with respect to the reciprocal R of deliberateness.

In the fuzzy inference section 35, the following eight fuzzy rules are set:

[First Rule] The smallest value among the adaptability of the predictiveness P for the fourth fuzzy set $LL_P$ associated with the predictiveness P, the adaptability of the effort Q for the fourth fuzzy set $LL_Q$ associated with the effort Q, and the adaptability of the reciprocal R of deliberateness for the first fuzzy set $SS_R$ associated with the reciprocal R of deliberateness is employed as a first fuzzy inference output $h_1$.

[Second Rule] The smallest value among the adaptability of the predictiveness P for the second fuzzy set $MS_P$ associated with the predictiveness P, the adaptability of the effort Q for the fourth fuzzy set $LL_Q$ associated with the effort Q, and the adaptability of the reciprocal R of deliberateness for the first fuzzy set $SS_R$ associated with the reciprocal R of deliberateness is employed as a second fuzzy inference output $h_2$.

[Third Rule] The smallest value among the adaptability of the predictiveness P for the third fuzzy set $ML_P$ associated with the predictiveness P, the adaptability of the effort Q for the second fuzzy set $MS_Q$ associated with the effort Q, and the adaptability of the reciprocal R of deliberateness for the second fuzzy set $MS_R$ associated with the reciprocal R of deliberateness is employed as a third fuzzy inference output $h_3$.

[Fourth Rule] The smallest value among the adaptability of the predictiveness P for the second fuzzy set $MS_P$ associated with the predictiveness P, the adaptability of the effort Q for the second fuzzy set $MS_Q$ associated with the effort Q, and the adaptability of the reciprocal R of deliberateness for the second fuzzy set $MS_R$ associated with the reciprocal R of deliberateness is employed as a fourth fuzzy inference output $h_4$.

[Fifth Rule] The smallest value among the adaptability of the predictiveness P for the second fuzzy set $MS_P$ associated with the predictiveness P, the adaptability of the effort Q for the second fuzzy set $MS_Q$ associated with the effort Q, and the adaptability of the reciprocal R of deliberateness for the third fuzzy set $ML_R$ associated with the reciprocal R of deliberateness is employed as a fifth fuzzy inference output $h_5$.

[Sixth Rule] The smallest value among the adaptability of the predictiveness P for the second fuzzy set $MS_P$ associated with the predictiveness P, the adaptability of the effort Q for the third fuzzy set $ML_Q$ associated with the effort Q, and the adaptability of the reciprocal R of deliberateness for the third fuzzy set $ML_R$ associated with the reciprocal R of deliberateness is employed as a sixth fuzzy inference output $h_6$.

[Seventh Rule] The smallest value among the adaptability of the predictiveness P for the first fuzzy set $SS_P$ associated with the predictiveness P, the adaptability of the effort Q for the third fuzzy set $ML_Q$ associated with the effort Q, and the adaptability of the reciprocal R of deliberateness for the fourth fuzzy set $LL_R$ associated with the reciprocal R of deliberateness is employed as a seventh fuzzy inference output $h_7$.

[Eighth Rule] The smallest value among the adaptability of the predictiveness P for the first fuzzy set $SS_P$ associated with the predictiveness P, the adaptability of the effort Q for the first fuzzy set $SS_Q$ associated with the effort Q, and the adaptability of the reciprocal R of deliberateness for the fourth fuzzy set $LL_R$ associated with the reciprocal R of deliberateness is employed as an eighth fuzzy inference output $h_8$. The first through eighth rules are arranged in order from the highest driving attentiveness level, as shown in Table below. Namely, the first to eighth rules are set in such a manner that the higher the driving attentiveness, the higher values the fuzzy inference outputs are set to by rules closer to the first rule.

TABLE

| | Predictiveness P | Effort Q | Deliberateness (1/R) | Attentiveness level |
|---|---|---|---|---|
| First Rule | LL | LL | LL | LL |
| Second Rule | MS | LL | LL | L |
| Third Rule | ML | MS | ML | ML |
| Fourth Rule | MS | MS | ML | M |
| Fifth Rule | MS | MS | MS | MS |
| Sixth Rule | MS | ML | MS | S |
| Seventh Rule | SS | ML | SS | SS |
| Eighth Rule | SS | SS | SS | SSS |

In principle, as seen from Table above, the higher the levels of the predictiveness, effort, and deliberateness, the higher the driving attentiveness level is estimated to be. For example, where a steering is performed in which the predictiveness P is big (LL), the effort Q is big, and also the deliberateness (1/R) is big, and thus the adaptability of the first rule to the steering action is large, the driving attentiveness level is estimated to be the highest. On the other hand, where the predictiveness is small (SS), the effort is small, and also the deliberateness is small, and thus the adaptability of the eighth rule is large, the driving attentiveness level is estimated to be the lowest (SSS).

The fuzzy inference section 35 calculates the sum "$1.0h_1+0.8h_2+0.6h_3+0.5h_4+0.4h_5+0.3h_6+0.2h_7$" of products obtained by multiplying each of the first to seventh fuzzy inference outputs $h_1$ to $h_7$ by a corresponding one of first to seventh coefficients 1.0, 0.8, 0.6, 0.5, 0.4, 0.3 and 0.2, and divides the thus-obtained sum of products by the sum of the first to eighth fuzzy inference outputs $h_1$ to $h_8$, to obtain a fuzzy inference output G' before vehicle speed-dependent correction. The output G' indicates a barycentric value of the respective adaptability of the first through eighth rules to the steering action.

The computer 30 further includes a vehicle speed calculating section 36 for calculating the vehicle speed from the vehicle speed data sampled by the vehicle speed data sampling section 32, and a vehicle speed correcting section 37. In the vehicle speed correcting section 37, the fuzzy inference output G' obtained by the fuzzy inference section 35 is corrected based on the vehicle speed V calculated by the vehicle speed calculating section 36, thereby obtaining a fuzzy inference output G after vehicle speed-dependent correction (vehicle speed-corrected fuzzy inference output) which represents the driving attentiveness level.

Figure 6:
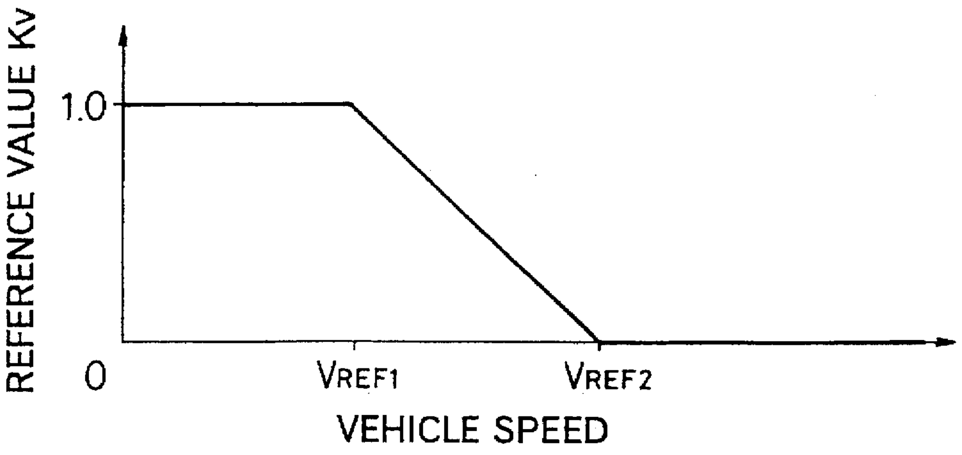
FIG. 6 is a graph showing a vehicle speed V-reference value $K_V$ map used for the vehicle speed-dependent correction of a fuzzy inference output.

Specifically, in this vehicle speed-dependent correction, the vehicle speed correcting section 37 obtains a reference value $K_V$ ($0 \leqq K_V \leqq 1$) dependent on the vehicle speed V, by looking up a vehicle speed V-reference value $K_V$ map shown in FIG. 6. Namely, in accordance with the map of FIG. 6, the reference value $K_V$ is set to the value "1" when the vehicle speed V is lower than a first predetermined vehicle speed $V_{REF1}$ (e.g., 50 km/h), is decreased from the value "1" to "0" with increase of the vehicle speed V within the range from the first predetermined vehicle speed $V_{REF1}$ to a second predetermined vehicle speed $V_{REF2}$ (e.g., 100 km/h), and is set to the value "0" when the vehicle speed V is higher than the second predetermined vehicle speed $V_{REF2}$.

Subsequently, the vehicle speed correcting section 37 looks up a fuzzy inference output correction map shown in FIG. 7, to obtain a vehicle speed-corrected fuzzy inference output G based on the fuzzy inference output G' before vechile speed-dependent correction and the reference value $K_V$. As seen from the correction map of FIG. 7, no substantial vehicle speed-dependent correction is effected if the reference value $K_V$ is "0", and a greater value is applied to the enlargement correction of the fuzzy inference output G' before vehicle speed correction with increase in the reference value $K_V$. Further, this enlargement correction value varies depending on the quantity of the fuzzy inference output G'; it is at a maximum when the fuzzy inference output G' is close to about 0.2 and decreases with both increase and decrease from about 0.2.

Figure 7:
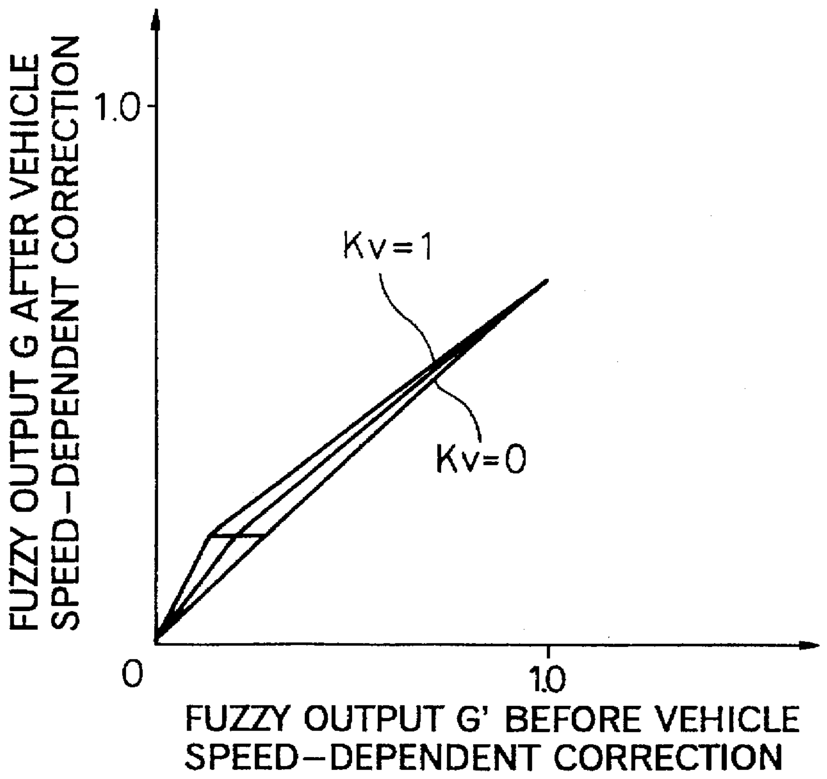
FIG. 7 is a graph showing a fuzzy inference output correction map used for the vehicle speed-dependent correction of a fuzzy inference output.
Figure 8:
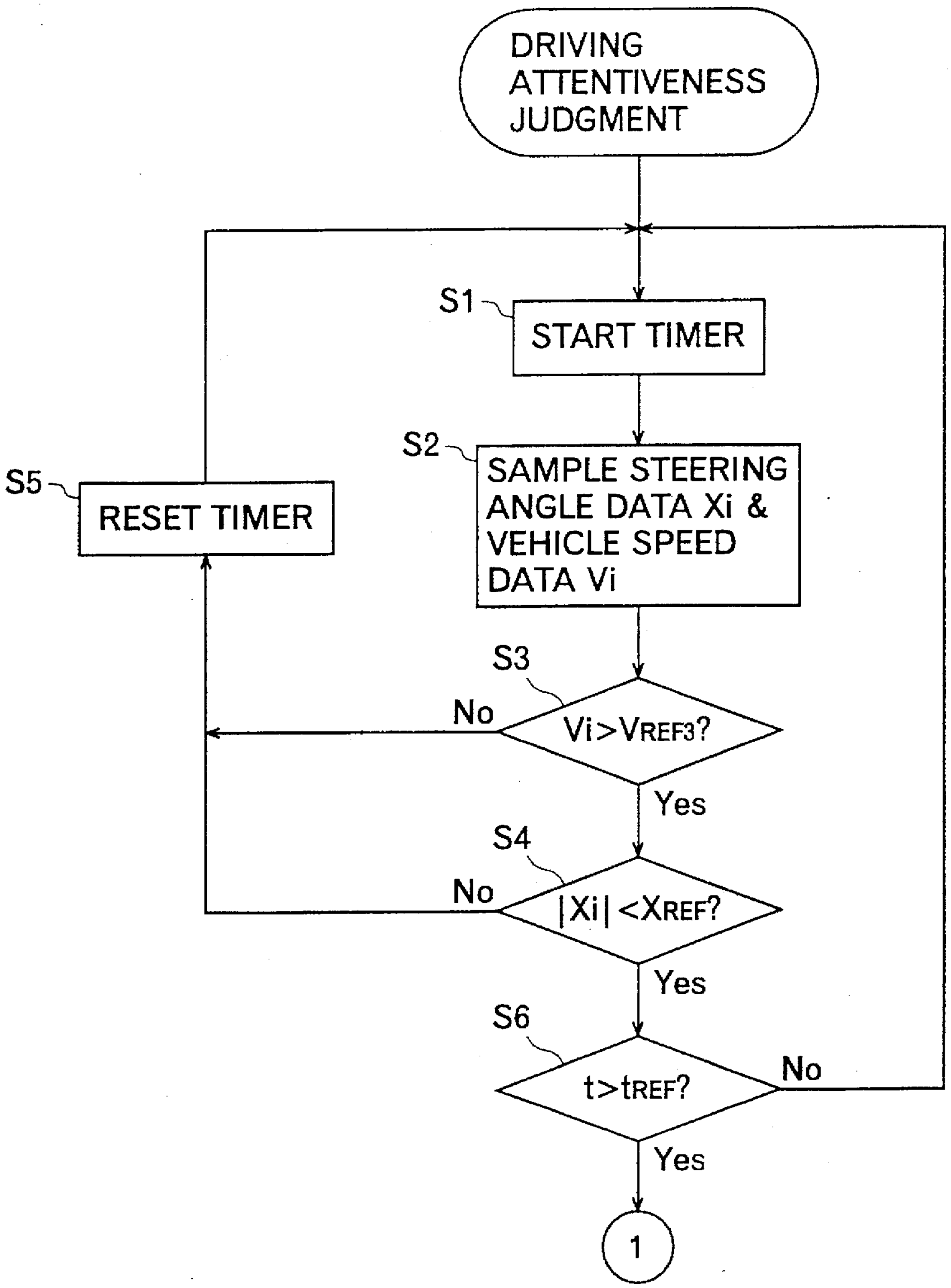
FIG. 8 is a flowchart showing a part of a driving attentiveness judgment routine executed by a computer shown in FIG. 1.
Figure 9:
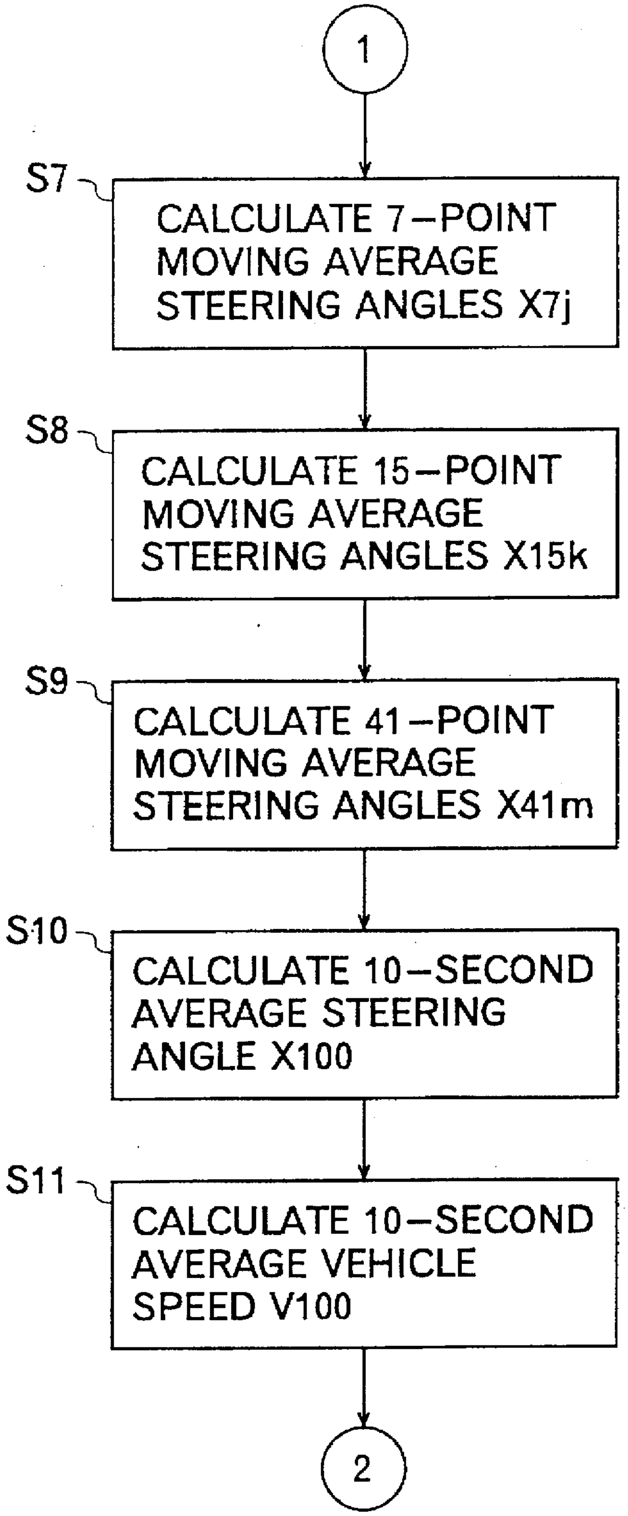
FIG. 9 is a flowchart showing another part of the driving attentiveness judgment routine subsequent to the part shown in FIG. 8.
Figure 10:
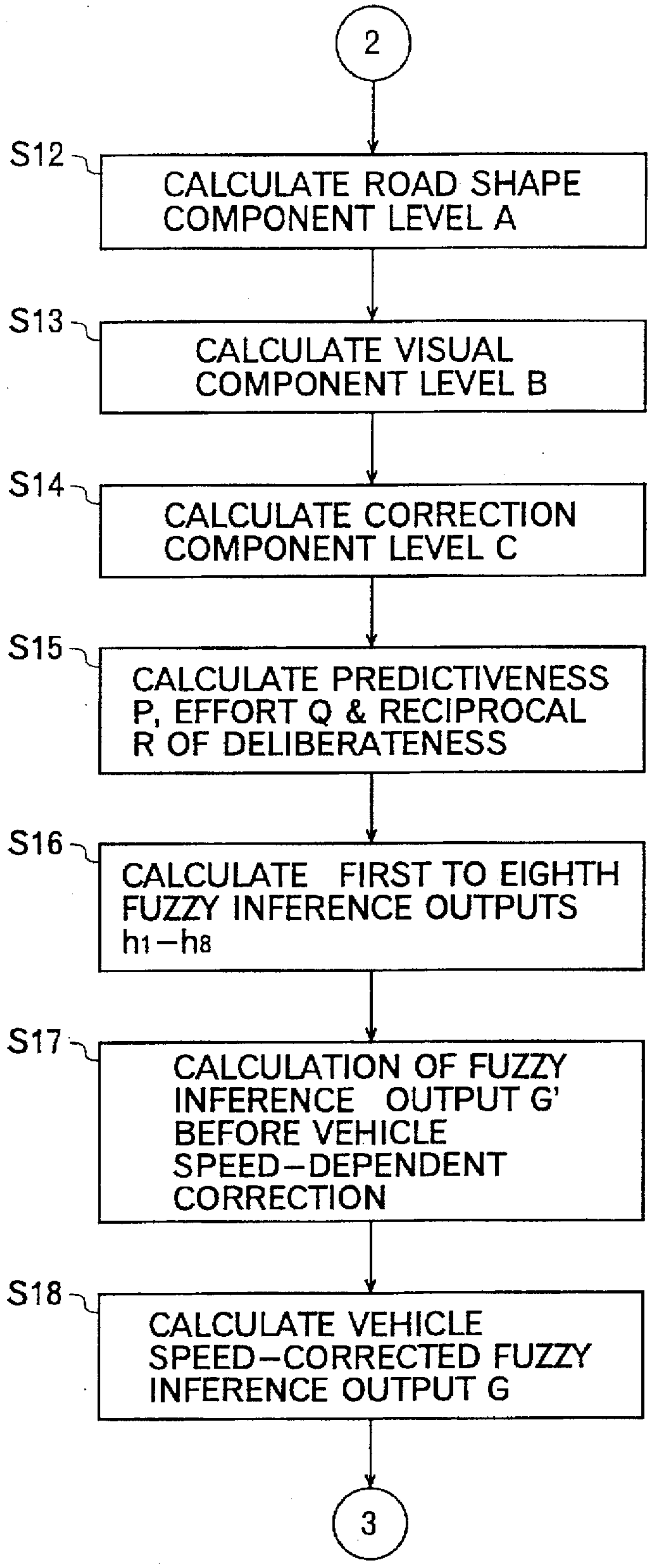
FIG. 10 is a flowchart showing still another part of the driving attentiveness judgment routine subsequent to the part shown in FIG. 9.
Figure 11:
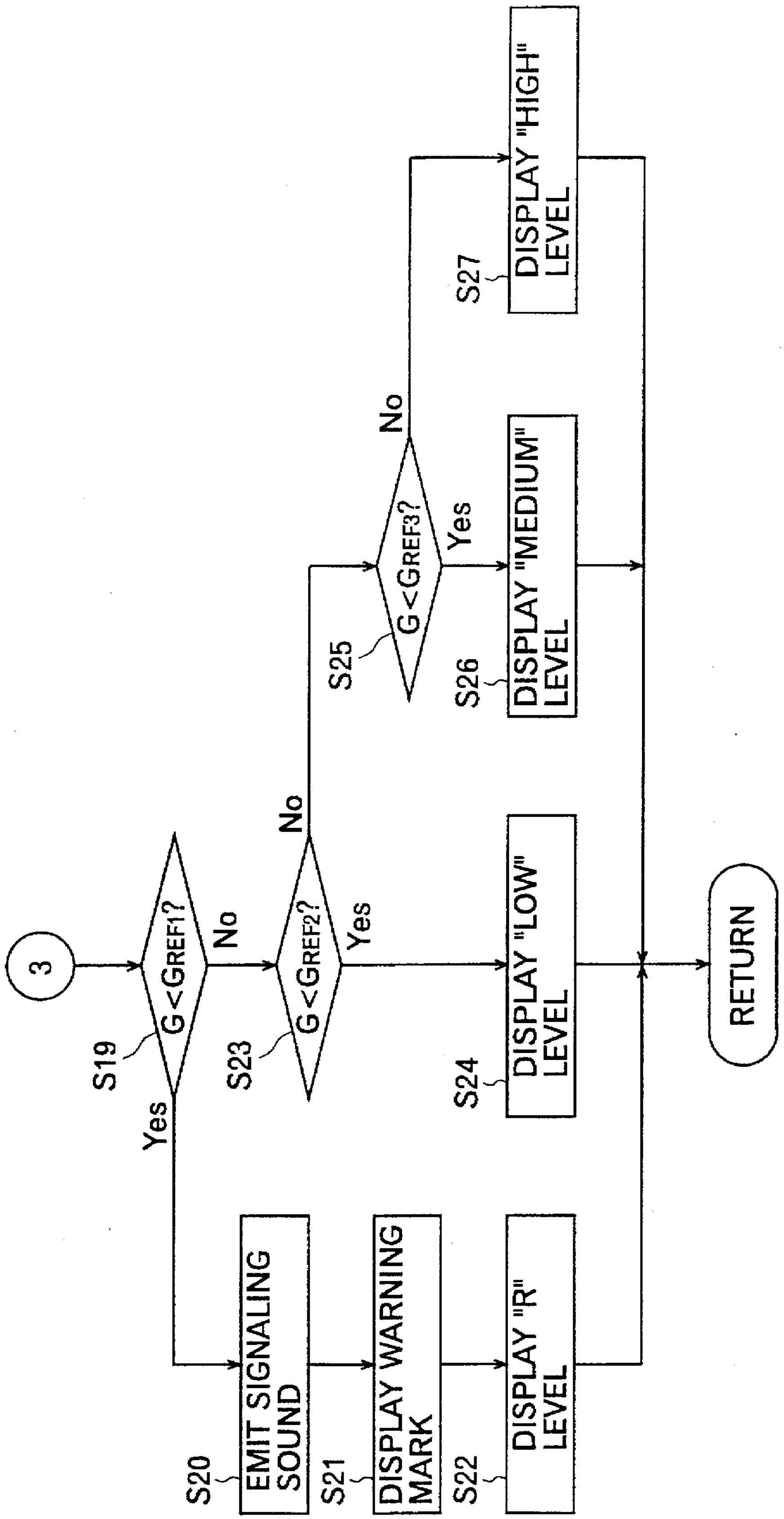
FIG. 11 is a flowchart showing the remaining part of the driving attentiveness judgment routine subsequent to the part shown in FIG. 10.

The maps of FIGS. 6 and 7 serve to prevent a lowering of the driving attentiveness especially in a low vehicle speed region from being overestimated, and are determined by actually moving a vehicle equipped with the driving attentiveness judging apparatus, for example.

The display output section 38 of the computer 30 drives the display device 40 and the signaling sound generator 50 in accordance with the result of comparison between the driving attentiveness obtained by the vehicle speed correcting section 37 and discriminative reference values.

The operation of the driving attentiveness judging apparatus constructed as above will be now explained.

During travel of the vehicle, the computer 30 of the apparatus executes a driving attentiveness judgment routine shown in FIGS. 8 through 11. In this judgment routine, the computer 30, as the steering angle data sampling section 31 and the vehicle speed data sampling section 32, starts a timer (not shown) for measuring the time t elapsed from the start of sampling (Step S1), and starts sampling the steering angle data $X_i$ from the steering angle sensor 10 and the vehicle speed data $V_i$ from the vehicle speed sensor 20 (Step S2). This sampling is carried out at the intervals of, for example, 0.1 second.

Subsequently, the computer 30, as the driving condition determining section 33, determines whether the vehicle speed $V_i$ sampled in the present cycle is higher than a predetermined value VREF3 (e.g., 40 km/h) (Step S3), and if the result of the decision is Yes, the computer 30 determines whether the absolute value $|X_i|$ of the presently sampled steering angle $X_i$ is smaller than a predetermined value $X_{REF}$ (e.g., 10 degrees) (Step S4). If the result of the decision in either Step S3 or S4 is No, that is, $V_i<V_{REF3}$ or $|X_i|>X_{REF}$, it is judged that determining the driving attentiveness in such vehicle traveling condition is inappropriate; therefore, the timer for measuring the time t elapsed from the start of sampling is reset (Step S5) and the flow of the routine returns to Step S1.

On the other hand, if the results of the decisions in Steps S3 and S4 are both Yes, it is determined whether the time t elapsed from the start of sampling is longer than a predetermined time period $t_{REF}$ (e.g., 14 seconds) (Step S6), and if the result of the decision in this step is No, the flow of the routine returns to Step S1. Accordingly, the sampling of the steering angle data $X_i$ and vehicle speed data $V_i$ is continued while both $V_i>V_{REF3}$ and $|X_i|<X_{REF}$ are fulfilled, and the sampled data are successively stored in a predetermined storage area of the memory (not shown) of the computer 30.

If the result of the decision in Step S6 thereafter becomes Yes upon lapse of the predetermined time period $t_{REF}$ after the start of sampling, and accordingly, steering angle data $X_1$ to $X_{140}$ and vehicle speed data $V_1$ to $V_{140}$ have been sampled, the computer 30 as the steering angle data processing section 34 successively obtains 7-point moving average steering angles $X7_j$ ($=(X_j+X_{j+1}+\ldots X_{j+6})/7$) for index j (=1, 2, . . . , 134) (Step S7). The period of calculation of the 7-point moving average steering angles $X7_j$, that is, 0.7 second, corresponds to the upper-limit frequency 1.4 Hz for the correction component of the steering angle data. Also, to calculate the 7-point moving average steering angles $X7_j$ from the steering angle data in this manner is almost equivalent to passing the steering angle data through a low-pass filter with a cut-off frequency of 1.4 Hz.

More specifically, the 7-point moving average steering angles are calculated as follows: First, with the index j set to the initial value "1", a first 7-point moving average steering angle $X7_1$ $(=(X_1+X_2+\ldots+X_7)/7)$ is obtained, then with the current index j successively updated by "1" at a time, second and subsequent 7-point moving average steering angles $X7_j$ are successively obtained, and finally, with the index j set to the last value "134", the last 7-point moving average steering angle $X7_{134}$ $(=(X_{134}+X_{135}\ldots+X_{140})/7)$ is obtained. The 134 7-point moving average steering angles $X7_1$ to $X7_{134}$ obtained in this manner are stored in the memory.

In Step S8, 15-point moving average steering angles $X15_k$ $(=(X_k+X_{k+1}+\ldots+X_{k+14})/15)$ are successively obtained for index k (=1, 2, . . . , 126) and stored in the memory, as in the case of the 7-point moving average steering angles $X7_j$, and in Step S9, 41-point moving average steering angles $X41_m$ $(=(X_m+X_{m+1}+\ldots+X_{m+40})/41)$ are successively obtained for index m (=1, 2, . . . , 100) and stored in the memory. The period of calculation of the 15-point moving average steering angles $X15_k$, that is, 1.5 seconds, corresponds to the lower-limit frequency 0.67 Hz for the correction component (i.e., the upper-limit frequency for the visual component) of the steering angle data, and the period of calculation of the 41-point moving average steering angles $X41_m$, that is, 4.1 seconds, corresponds to the lower-limit frequency 0.25 Hz for the visual component (i.e., the upper-limit frequency for the road shape component) of the steering angle data.

Then, in Step S10, an average steering angle X100 $(=(X_{21}+X_{22}+\ldots+X_{120})/100)$ for the middle 10 seconds during the sampling period is obtained and stored in the memory, and in Step S11, an average vehicle speed V100 $(=(V_{21}+V_{22}+\ldots V_{120})/100)$ for the middle 10 seconds during the sampling period is obtained and stored in the memory. The period of calculation of the average steering angle X100, that is, 10 seconds, corresponds to the lower-limit frequency 0.1 Hz for the road shape component of the steering angle data.

In Step S12, the computer 30 as the steering angle data processing section 34 successively obtains the absolute values of values which are obtained by subtracting the average steering angle X100 from each of the 41-point moving average steering angles $X41_m$ associated with the index m (=1, 2, . . . , 100), and then divides the sum of the absolute values by "100", to obtain the level A $(=(|X41_1-X100|+|X41_2-X100|+\ldots+|X41_{100}-X100|)/100)$ of the first steering frequency component that manifests itself in the steering angle data in relation to the road shape follow-up steering. In the case where the calculated value A is smaller than "0.05", the value "0.05" is set as the first steering frequency component level A.

In Step S13, the computer 30 successively obtains the absolute values of values which are obtained by subtracting the 41-point moving average steering angles $X41_m$ associated with the index m (=1, 2, . . . , 100), from corresponding ones of the 15-point moving average steering angles $X15_k$ associated with the index k (=14, 15, . . . , 113), and then divides the sum of the absolute values by "100", to obtain the level B $(=(|X15_{14}-X41_1|+|X15_{15}-X41_2|+\ldots+|X15_{113}-X41_{100}|)/100)$ of the second steering frequency component that corresponds to the visual steering. In the case where the calculated value B is smaller than "0.05", the value "0.05" is set as the second steering frequency component level B.

In Step S14, the computer 30 successively obtains the absolute values of values which are obtained by subtracting the 15-point moving average steering angles $X15_k$ associated with the index k (=14, 15, . . . , 113), from corresponding ones of the 7-point moving average steering angles $X7_j$ associated with the index j (=18, 19, . . . , 117), and then divides the sum of the absolute values by "100", to obtain the level C $(=(|X7_{18}-X15_{14}|+|X7_{19}-X15_{15}|+\ldots+|X7_{117}-X15_{113}|)/100)$ of the third steering frequency component that corresponds to the corrective steering. In the case where the calculated value C is smaller than "0.05", the value "0.05" is set as the third steering frequency component level C.

Then, in Step S15, the predictiveness P of the driver's steering action is calculated based on the first and second steering frequency component levels A and B, according to the aforementioned expression P=log(200A)/log(200B), the effort Q is calculated based on the second and third steering frequency component levels B and C, according to the expression Q=log(200C)/log(200B), and the reciprocal R of deliberateness is calculated based on the third steering frequency component level C, according to the expression R=10log(200C). The calculated values P, Q and R are stored in the memory.

In Step S16, the computer 30 as the fuzzy inference section 35 successively obtains the first to eighth fuzzy inference outputs $h_1$ to $h_8$ on the basis of the predictiveness P, the effort Q, the reciprocal R of deliberateness, and the aforementioned eight rules. For example, the first fuzzy inference output $h_1$ is calculated by successively obtaining the adaptability of the predictiveness P for the fuzzy set $SS_P$, the adaptability of the effort Q for the fuzzy set $SS_Q$, and the adaptability of the reciprocal R of deliberateness for the fuzzy set $LL_R$, then obtaining the smallest value among the three adaptabilities and storing the same in the memory as the first fuzzy inference output $h_1$. Description of the manner of calculating the other fuzzy inference outputs $h_2$ to $h_8$ is omitted here.

Then, in Step S17, the sum "$1.0h_1+0.8h_2+0.6h_3 0.5h_4+0.4h_5+0.3h_6+0.2h_7$" of products obtained by multiplying the first to seventh fuzzy inference outputs $h_1$ to $h_7$ by corresponding ones of the first to seventh coefficients 1.0, 0.8, 0.6, 0.5, 0.4, 0.3 and 0.2 is obtained, and the sum thus obtained is divided by the sum of the first to eighth fuzzy inference outputs $h_1$ to $h_8$, to obtain a fuzzy inference output representing the driving attentiveness G' before vehicle speed-dependent correction. The calculated value G' is stored in the memory.

In Step S18, the computer 30 as the vehicle speed correcting section 37 obtains the reference value $K_V$ $(0<K_V<1)$ corresponding to the average vehicle speed V100, by looking up the vehicle speed V-reference value $K_V$ map shown in FIG. 6, then obtains the vehicle speed-corrected fuzzy inference output G based on the fuzzy inference output G' before vehicle speed-dependent correction and the reference value $K_V$, by looking up the correction map shown in FIG. 7, and stores the calculated value G in the memory.

Figure 12:
FIG. 12 is a diagram of a warning mark shown on a display when driving attentiveness is low.
Figure 13:
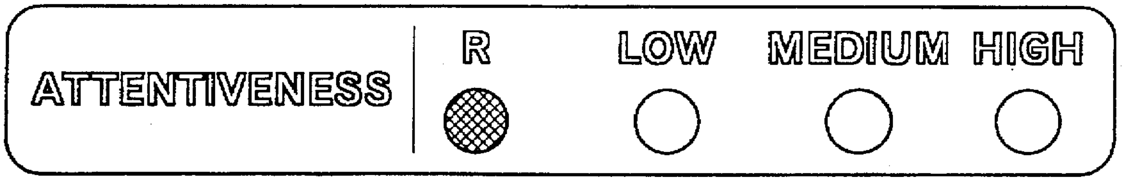
FIG. 13 is a diagram of a driving attentiveness level indication.

Subsequently, in Step S19, the computer 30 as the display output section 38 determines whether the vehicle speed-corrected driving attentiveness level G is smaller than a first discriminative reference value $G_{REF1}$ (e.g., 0.08). If the result of this decision is Yes, the computer 30 sounds the buzzer 50 and causes the head-up display 40 to display a warning mark, shown in FIG. 12, on the windshield for a predetermined period of, for example, 2 seconds (Steps S20, S21), then displays an "R" level mark, which indicates that the driving attentiveness is extremely low, on the windshield for 2 seconds, for example, as shown in FIG. 13 (Step S22).

If it is judged in Step S19 that the driving attentiveness level G is not smaller than the first discriminative reference value $G_{REF1}$, it is then determined whether the driving attentiveness level G is smaller than a second discriminative reference value $G_{REF2}$ (e.g., 0.21) (Step S23). If the result of this decision is Yes, a "LOW" level mark, which indicates that the driving attentiveness is low, is displayed (Step S24).

If it is judged in Step S23 that the driving attentiveness level G is not smaller than the second discriminative reference value $G_{REF2}$, then it is determined whether the driving attentiveness level G is smaller than a third discriminative reference value $G_{REF3}$ (e.g., 0.6) (Step S25). If the result of this decision is Yes, a "MEDIUM" level mark, which indicates that the driving attentiveness is of medium level, is displayed (Step S26). If, on the other hand, it is judged in Step S25 that the driving attentiveness level G is not smaller than the third discriminative reference value $G_{REF3}$, a "HIGH" level mark, which indicates that the driving attentiveness level is high, is displayed (Step S27).

After the driving attentiveness level is displayed in Step S22, S24, S26 or S27, the flow of the routine returns to Step S1.

The present invention is not limited to the above embodiment and various modifications may be made.

In the above embodiment, the driving attentiveness level is estimated by using the road shape component, visual component and correction component as the first to third steering frequency components of the steering angle data, but it is not essential to use all of the first to third steering frequency components for the estimation. Namely, the driving attentiveness level may be estimated by using only two steering frequency components having respective different frequency bands. For example, the road shape component and the visual component, or the visual component and the correction component may be used.

Further, in the embodiment, the driving attentiveness level is estimated by using the predictiveness P, effort Q, and reciprocal R of deliberateness as the first to third steering action factors, but it is not essential to use these parameters P, Q and R. For example, it is possible to estimate the driving attentiveness level based on the ratio (corresponding to the predictiveness P or the effort Q) of the logarithm of one of two steering frequency components having respective different frequency bands to the logarithm of the other of the two components, or more generally, the ratio of one of two steering frequency components to the other.

In the case of using the road shape component and the visual component for estimating the driving attentiveness level, preferably the predictiveness is obtained based on the ratio of the road shape component to the visual component and the estimation is made such that the lower the predictiveness, the lower the driving attentiveness level. On the other hand, in the case of using the visual component and the correction component for estimating the driving attentiveness level, preferably the effort is obtained based on the ratio of the correction component to the visual component and the estimation is made such that the lower the effort, the lower the driving attentiveness level.

In the foregoing embodiment, the road shape component, the visual component and the correction component are obtained from the steering angle data by performing frequency analysis involving moving average calculations. The frequency analysis of the steering angle data may be carried out by means of a plurality of band-pass filters or fast Fourier transform.

Further, although in the embodiment the head-up display is used to display the warning mark and the driving attentiveness level, other display devices may be used instead. Also, the forms and contents of the warning mark and driving attentiveness level are not limited to those shown in FIGS. 12 and 13. Furthermore, in the above embodiment, the signaling sound is emitted once prior to the display of the warning mark, but the signaling sound may be emitted also when the driving attentiveness levels "R", "LOW", "MEDIUM" and "HIGH" are displayed.

The steering angle sensor and the vehicle speed sensor are not limited to those constructions described in the foregoing embodiment. For example, although in the embodiment is used a steering angle sensor having a signal processing section for obtaining steering angle data from the steering pulse signals and the neutral position signal, a steering angle sensor having no signal processing section may be used instead. In this case, the function of the signal processing section of the steering angle sensor may be achieved, for example, by the computer 30 shown in FIG. 1.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A driving attentiveness judging method comprising:

a steering angle detecting step of detecting a steering angle of a motor vehicle to obtain steering angle data;

a steering frequency component detecting step of detecting at least two of a plurality of steering frequency components of respective different frequency bands from the steering angle data; and an attentiveness determining step of estimating a driving attentiveness level based on a ratio of one of said at least two of said plurality of steering components detected to another one of said at least two of said plurality of steering frequency components detected.

2. The driving attentiveness judging method according to claim 1, wherein said attentiveness determining step includes obtaining respective logarithms of the plurality of steering frequency components detected in said steering frequency component detecting step, and estimating the driving attentiveness level based on a ratio of one to another of the obtained logarithms.

3. The driving attentiveness judging method according to claim 1, wherein said attentiveness determining step includes obtaining a steering action factor based on the ratio of said one of said at least two of said plurality of steering components detected to another one of said at least two of said plurality of steering frequency components detected, and estimating the driving attentiveness level such that the driving attentiveness level lowers with reduction in level of the steering action factor.

4. The driving attentiveness judging method according to claim 1, wherein said steering frequency component detecting step includes detecting a first steering frequency component corresponding to a road shape follow-up steering by a driver, a second steering frequency component which is on a higher frequency side than the first steering frequency component and which corresponds to a visual steering by the driver, and a third steering frequency component which is on a higher frequency side than the second steering frequency component and which corresponds to a corrective steering by the driver.

5. The driving attentiveness judging method according to claim 4, wherein said steering frequency component detecting step includes detecting, as said first, second and third steering frequency components, frequency components falling within a frequency range of 0.1 to 0.25 HZ, a frequency range of 0.25 to 0.67 Hz, and a frequency range of 0.67 to 1.4 Hz, respectively.

6. The driving attentiveness judging method according to claim 4, wherein said attentiveness determining step includes:

obtaining at least one of a first steering action factor corresponding to predictiveness of steering action and a second steering action factor corresponding to effort of steering action, said first steering action factor being obtainable based on a ratio of the first steering frequency component to the second steering frequency component, said second steering action factor being obtainable based on a ratio of the third steering frequency component to the second steering frequency component;

obtaining based on the third steering frequency component a third steering action factor corresponding to deliberateness of steering action; and estimating the driving attentiveness level such that the driving attentiveness level lowers with reduction in level of the obtained at least one of the first and second steering action factors and with reduction in level of the third steering action factor.

7. The driving attentiveness judging method according to claim 1, wherein said steering frequency component detecting step includes detecting a first steering frequency component corresponding to a road shape follow-up steering by a driver, and a second steering frequency component which is on a higher frequency side than the first steering frequency component and which corresponds to a visual steering by the driver; and said attentiveness determining step includes obtaining, based on a ratio of the first steering frequency component to the second steering frequency component, a steering action factor corresponding to predictiveness of steering action, and estimating the driving attentiveness level such that the driving attentiveness level lowers with reduction in level of the steering action factor corresponding to the predictiveness.

8. The driving attentiveness judging method according to claim 1, wherein said steering frequency component detecting step includes detecting a steering frequency component corresponding to a visual steering by a driver, and a steering frequency component which is on a higher frequency side than the steering frequency component corresponding to the visual steering and which corresponds to a corrective steering by the driver; and said attentiveness determining step includes obtaining, based on a ratio of the steering frequency component corresponding to the corrective steering to the steering frequency component corresponding to the visual steering, a steering action factor corresponding to effort of steering action, and estimating the driving attentiveness level such that the driving attentiveness level lowers with reduction in level of the steering action factor corresponding to the effort.

9. The driving attentiveness judging method according to claim 1, wherein said attentiveness determining step includes performing fuzzy inference based on respective levels of said plurality of steering frequency components detected and a plurality of fuzzy rules, to thereby estimate the driving attentiveness level.

10. The driving attentiveness judging method according to claim 9, wherein said steering frequency component detecting step includes detecting a first steering frequency component corresponding to a road shape follow-up steering by a driver, a second steering frequency component which is on a higher frequency side than the first steering frequency component and which corresponds to a visual steering by the driver, and a third steering frequency component which is on a higher frequency side than the second steering frequency component and which corresponds to a corrective steering by the driver; and said attentiveness determining step includes obtaining, based on the first, second and third steering frequency components, first, second and third steering action factors corresponding respectively to predictiveness, effort and deliberateness of steering action as fuzzy variables, and performing the fuzzy inference by using fuzzy rules which prescribe that the driving attentiveness level lowers with reduction in level of the first, second and third steering action factors.

11. The driving attentiveness judging method according to claim 9, wherein said steering frequency component detecting step includes detecting a first steering frequency component corresponding to a road shape follow-up steering by a driver, a second steering frequency component which is on a higher frequency side than the first steering frequency component and which corresponds to a visual steering by the driver, and a third steering frequency component which is on a higher frequency side than the second steering frequency component and which corresponds to a corrective steering by the driver; and said attentiveness determining step includes obtaining, based on the first through third steering frequency components, first, second and third steering action factors corresponding respectively to predictiveness, effort and deliberateness of steering action as fuzzy variables, and performing the fuzzy inference by using fuzzy rules which prescribe that the driving attentiveness level rises with increase in level of the first, second and third steering action factors.

12. The driving attentiveness judging method according to claim 1, which further comprises:

a vehicle speed detecting step of detecting vehicle speed; and wherein said steering frequency component detecting step includes detecting said plurality of steering frequency components only when a vehicle operating state in which the vehicle speed is higher than or equal to a predetermined value and also the steering angle is smaller than or equal to a predetermined steering angle continues for a predetermined time period.

13. The driving attentiveness judging method according to claim 1, which further comprises:

a vehicle speed detecting step of detecting vehicle speed; and a vehicle speed correcting step of increasingly correcting the driving attentiveness level estimated in said attentiveness determining step when the motor vehicle is traveling at low vehicle speed.

14. The driving attentiveness judging method according to claim 1, which further comprises:

a warning step of warning that driving attentiveness is low when the driving attentiveness level estimated in said attentiveness determining step is lower than a predetermined level.

15. A driving attentiveness judging apparatus comprising:

steering angle detecting means for detecting a steering angle of a motor vehicle to obtain steering angle data;

steering frequency component detecting means for detecting at least two of a plurality of steering frequency components of respective different frequency bands from the steering angle data; and attentiveness determining means for estimating a driving attentiveness level based on a ratio of one of said at least two of said plurality of steering components detected to another one of said at least two of said plurality of steering frequency components detected.

16. The driving attentiveness judging apparatus according to claim 15, wherein said steering frequency component detecting means includes a data sampling section for sampling the steering angle data at predetermined intervals, and a steering angle data processing section for subjecting the sampled steering angle data to frequency analysis to obtain said plurality of steering frequency components.

17. The driving attentiveness judging apparatus according to claim 15, wherein said attentiveness determining means obtains respective logarithms of the plurality of steering frequency components detected by said steering frequency component detecting means, and estimates the driving attentiveness level based on a ratio of one to another of the obtained logarithms.

18. The driving attentiveness judging apparatus according to claim 15, wherein said attentiveness determining means obtains a steering action factor based on the ratio of said one of said at least two of said plurality of steering components detected to another one of said at least two of said plurality of steering frequency components detected, and estimates the driving attentiveness level such that the driving attentiveness level lowers with reduction in level of the steering action factor.

19. The driving attentiveness judging apparatus according to claim 15, wherein said steering frequency component detecting means detects a first steering frequency component corresponding to a road shape follow-up steering by a driver, a second steering frequency component which is on a higher frequency side than the first steering frequency component and which corresponds to a visual steering by the driver, and a third steering frequency component which is on a higher frequency side than the second steering frequency component and which corresponds to a corrective steering by the driver.

20. The driving attentiveness judging apparatus according to claim 19, wherein said steering frequency component detecting means detects, as the first, second and third steering frequency components, frequency components falling within a frequency range of 0.1 to 0.25 HZ, a frequency range of 0.25 to 0.67 Hz, and a frequency range of 0.67 to 1.4 Hz, respectively.

21. The driving attentiveness judging apparatus according to claim 19, wherein said attentiveness determining means obtains at least one of a first steering action factor corresponding to predictiveness of steering action and a second steering action factor corresponding to effort of steering action, said first steering action factor being obtainable based on a ratio of the first steering frequency component to the second steering frequency component, said second steering action factor being obtainable based on a ratio of the third steering frequency component to the second steering frequency component; obtains based on the third steering frequency component a third steering action factor corresponding to deliberateness of steering action; and estimates the driving attentiveness level such that the driving attentiveness level lowers with reduction in level of the obtained at least one of the first and second steering action factor and with reduction in level of the third steering action factor.

22. The driving attentiveness judging apparatus according to claim 15, wherein said steering frequency component detecting means detects a first steering frequency component corresponding to a road shape follow-up steering by a driver, and a second steering frequency component which is on a higher frequency side than the first steering frequency component and which corresponds to a visual steering by the driver; and said attentiveness determining means obtains, based on a ratio of the first steering frequency component to the second steering frequency component, a steering action factor corresponding to predictiveness of steering action, and estimates the driving attentiveness level such that the driving attentiveness level lowers with reduction in level of the steering action factor corresponding to the predictiveness.

23. The driving attentiveness judging apparatus according to claim 15, wherein said steering frequency component detecting means detects a steering frequency component corresponding to a visual steering by a driver, and a steering frequency component which is on a higher frequency side than the steering frequency component corresponding to the visual steering and which corresponds to a corrective steering by the driver; and said attentiveness determining means obtains, based on a ratio of the steering frequency component corresponding to the corrective steering to the steering frequency component corresponding to the visual steering, a steering action factor corresponding to effort of steering action, and estimates the driving attentiveness level such that the driving attentiveness level lowers with reduction in level of the steering action factor corresponding to the effort.

24. The driving attentiveness judging apparatus according to claim 15, wherein said attentiveness determining means includes a fuzzy inference section for performing fuzzy inference based on respective levels of said plurality of steering frequency components detected and a plurality of fuzzy rules, to thereby estimate the driving attentiveness level.

25. The driving attentiveness judging apparatus according to claim 24, wherein said steering frequency component detecting means detects a first steering frequency component corresponding to a road shape follow-up steering by a driver, a second steering frequency component which is on a higher frequency side than the first steering frequency component and which corresponds to a visual steering by the driver, and a third steering frequency component which is on a higher frequency side than the second steering frequency component and which corresponds to a corrective steering by the driver; and said fuzzy inference section obtains, based on the first, second and third steering frequency components, first, second and third steering action factors corresponding respectively to predictiveness, effort and deliberateness of steering action as fuzzy variables, and performs the fuzzy inference by using fuzzy rules which prescribe that the driving attentiveness level lowers with reduction in level of the first, second and third steering action factors.

26. The driving attentiveness judging apparatus according to claim 26, wherein said steering frequency component detecting means detects a first steering frequency component corresponding to a road shape follow-up steering by a driver, a second steering frequency component which is on a higher frequency side than the first steering frequency component and which corresponds to a visual steering by the driver, and a third steering frequency component which is on a higher frequency side than the second steering frequency component and which corresponds to a corrective steering by the driver; and said fuzzy inference section obtains, based on the first, second and third steering frequency components, first, second and third steering action factors corresponding respectively to predictiveness, effort and deliberateness of steering action as fuzzy variables, and performs the fuzzy inference by using fuzzy rules which prescribe that the driving attentiveness level rises with increase in level of the first, second and third steering action factors.

27. The driving attentiveness judging apparatus according to claim 15, which further comprises:

vehicle speed detecting means for detecting vehicle speed; and wherein said steering frequency component detecting means includes a driving condition determining section for determining whether or not a vehicle operating state in which the vehicle speed is higher than or equal to a predetermined value and also the steering angle is smaller than or equal to a predetermined steering angle has continued for a predetermined time period, and detects said plurality of steering frequency components only when the vehicle operating state has continued for the predetermined time period.

28. The driving attentiveness judging apparatus according to claim 15, which further comprises:

vehicle speed detecting means for detecting vehicle speed; and vehicle speed correcting means for increasingly correcting the driving attentiveness level estimated by said attentiveness determining means when the motor vehicle is traveling at low vehicle speed.

29. The driving attentiveness judging apparatus according to claim 15, which further comprises:

warning means for warning that driving attentiveness is low when the driving attentiveness level estimated by said attentiveness determining means is lower than a predetermined level.

* * * * *

UNITED STATES PATENT AND TRADEMARK OFFICE

CERTIFICATE OF CORRECTION

PATENT NO. : 5,717,606
DATED : February 10, 1998
INVENTOR(S) : HARA et al.

It is certified that error appears in the above-indentified patent and that said Letters Patent is hereby corrected as shown below:

Claim 26, line 2, please change "26" to --15--.

Signed and Sealed this

Eleventh Day of August 1998

Attest:

BRUCE LEHMAN

*Attesting Officer* — *Commissioner of Patents and Trademarks*